(12) United States Patent
Mears et al.

(10) Patent No.: US 8,688,096 B2
(45) Date of Patent: Apr. 1, 2014

(54) METHOD AND APPARATUS FOR PROVIDING PICTURE CALLER IDENTIFICATION FEATURE

(75) Inventors: Mark Gilmore Mears, Zionsville, IN (US); Chung Him Kwong, Hong Kong (HK)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 12/679,075

(22) PCT Filed: Sep. 19, 2007

(86) PCT No.: PCT/US2007/020301
§ 371 (c)(1),
(2), (4) Date: Mar. 19, 2010

(87) PCT Pub. No.: WO2009/038560
PCT Pub. Date: Mar. 26, 2009

(65) Prior Publication Data
US 2010/0248703 A1    Sep. 30, 2010

(51) Int. Cl.
*H04M 3/00*    (2006.01)
(52) U.S. Cl.
USPC ....... 455/418; 455/566; 455/415; 379/142.06
(58) Field of Classification Search
USPC ............ 455/418, 415, 566; 379/142, 142.06; 345/619
See application file for complete search history.

(56) References Cited

U.S. PATENT DOCUMENTS

| | | | | |
|---|---|---|---|---|
| 5,907,604 A * | 5/1999 | Hsu | | 379/142.06 |
| 6,865,386 B2 * | 3/2005 | Aoyama et al. | | 455/415 |
| 7,974,609 B2 * | 7/2011 | Lee et al. | | 455/415 |
| 2002/0094806 A1 | 7/2002 | Kamimura | | |
| 2003/0153337 A1 | 8/2003 | Ito | | |
| 2004/0203835 A1 * | 10/2004 | Trottier et al. | | 455/454 |
| 2007/0268309 A1 * | 11/2007 | Tanigawa et al. | | 345/619 |

FOREIGN PATENT DOCUMENTS

| | | |
|---|---|---|
| CA | 2175263 | 4/1996 |
| EP | 0 741 484 A | 11/1996 |
| EP | 1770968 | 9/2006 |
| JP | 8336121 | 12/1996 |
| JP | 9172484 | 6/1997 |
| JP | 2000253111 | 9/2000 |
| JP | 2001285420 | 10/2001 |
| JP | 2001308985 | 11/2001 |
| JP | 2002101184 | 4/2002 |
| JP | 2002176679 | 6/2002 |
| JP | 2005269541 | 9/2005 |
| JP | 2006094190 | 4/2006 |
| JP | 2007172070 | 5/2007 |
| JP | 2007096574 | 12/2007 |
| WO | WO 2006/005666 A | 1/2006 |

OTHER PUBLICATIONS

Search Report dtd Jul. 25, 2008.

* cited by examiner

*Primary Examiner* — Danh Le
(74) *Attorney, Agent, or Firm* — Robert D. Shedd; Vincent E. Duffy; James McKenzie

(57) ABSTRACT

An apparatus having a picture caller identification ("CID") feature provides enhanced entertainment value and is also capable of preventing screen burn. According to an exemplary embodiment, the apparatus includes a memory operative to store data indicating an association between a first plurality of pictures and a first phone number, and a processor operative to enable display of the first plurality of pictures in response to receiving a phone call from the first phone number.

18 Claims, 4 Drawing Sheets

METHOD AND APPARATUS FOR PROVIDING PICTURE CALLER IDENTIFICATION FEATURE

This application claims the benefit under 35 U.S.C. §365 of international Application PCT/US2007/020301, filed Sep. 19, 2007, which was published in accordance with PCT article 21(2) on Mar. 26, 2009, in English.

BACKGROUND INFORMATION

CID is a popular feature for telecommunications type devices. Conventional CID features typically display a caller's phone number and name (if available) upon receiving an incoming phone call from the caller. In this manner, CID enables a party receiving an incoming phone call to know the identity of the caller before answering the call, and may for example be used as a means by which parties can screen their calls.

Another form of CID involves displaying a single picture corresponding to a caller upon receiving an incoming phone call from the caller. For example, certain cell phones provide an option whereby users can link a pre-stored cartoon image to a caller's phone book entry. Thereafter, the pre-stored cartoon image is displayed upon receiving an incoming phone call from the caller. While this form of CID may be useful for indicating the identity of a caller, it has some associated problems. First, this form of CID provides only limited entertainment value because only a single picture is displayed upon receiving an incoming phone call. Moreover, because only a single picture is displayed, it fails to prevent, and may even contribute to, screen burn.

Accordingly, there is a need for a method and apparatus for providing a picture CID feature that addresses the foregoing problems and thereby provides enhanced entertainment value and is also capable of preventing screen burn. The present embodiments address these and/or other issues.

SUMMARY OF THE INVENTION

In accordance with an aspect of the present embodiments, a method of displaying pictures using an apparatus is disclosed. According to an exemplary embodiment, the method includes the steps of associating a first group of pictures with a first number, and displaying the first group of pictures in response to receiving a call from the first number.

In accordance with another aspect of the present embodiments, an apparatus is disclosed. According to an exemplary embodiment, the apparatus includes means, such as a memory, for storing data indicating an association between a first group of pictures and a first phone number, and means, such as a processor, for enabling display of the first group of pictures in response to receiving a phone call from the first phone number.

BRIEF DESCRIPTION OF THE DRAWINGS

The above-mentioned and other features and advantages of the present embodiments, and the manner of attaining them, will become more apparent and the embodiments will be better understood by reference to the following description taken in conjunction with the accompanying drawings, wherein.

The exemplifications set out herein illustrate preferred embodiments of the present disclosure, and such exemplifications are not to be construed as limiting the scope of the disclosure in any manner.

DESCRIPTION OF THE PREFERRED EMBODIMENTS

Figure 1:
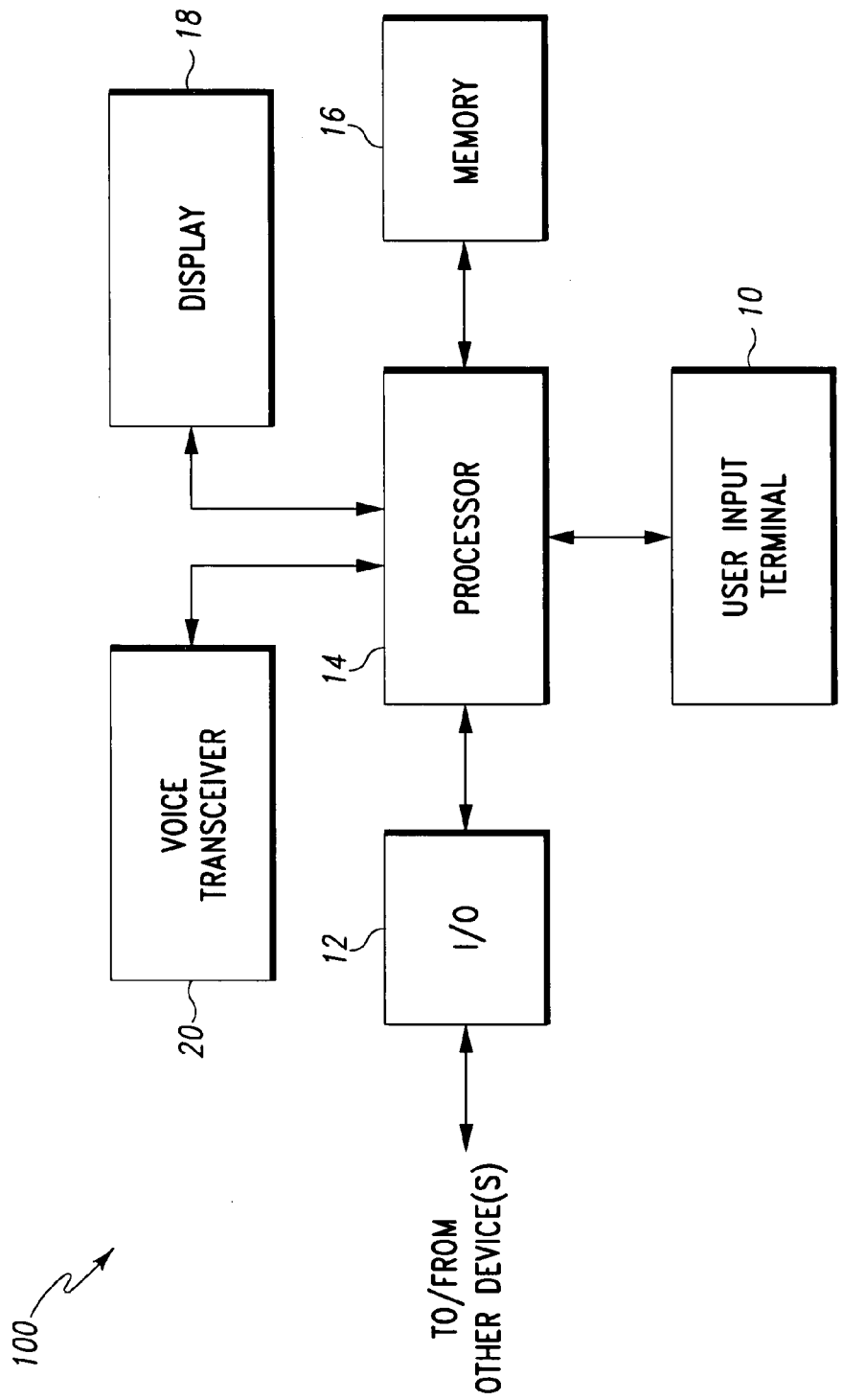
FIG. 1 is a block diagram of an exemplary embodiment of the present disclosure.

Referring now to the drawings, and more particularly to FIG. 1, a block diagram of an embodiment of a telecommunications apparatus 100 according to aspects of the present disclosure is shown. In general, a telecommunications apparatus may include but is not limited to a landline telephone type device, cellular telephone type device, or an internet type telephone device. As indicated in FIG. 1, telecommunications apparatus 100 comprises user input means such as user input terminal 10, input/output (I/O) means such as I/O block 12, processing means such as processor 14, data storage means such as memory 16, visual I/O means such as display 18, and aural I/O means such as voice transceiver 20. Some of the foregoing elements of telecommunications apparatus 100 may be implemented using one or more integrated circuits (ICs). For clarity of description, certain conventional elements associated with telecommunications apparatus 100 such as certain control signals, power signals and/or other elements may not be shown in FIG. 1. According to an exemplary embodiment, telecommunications apparatus 100 of FIG. 1 may be implemented as any type of device, system and/or apparatus having a telephonic communication capability, and may for example be integrated into devices, systems and/or apparatuses having other capabilities such as audio and/or video processing capabilities.

User input terminal 10 is operative to receive inputs from users, and to output signals corresponding to the user inputs to processor 14. According to an exemplary embodiment, user input terminal 10 may be implemented as a keypad having a plurality of keys that enable numeric and alphabetic input capabilities. User input terminal 10 may also include voice input capabilities. User input terminal 10 may for example be illuminated when in use (e.g., via light emitting diodes (LEDs) and/or other illumination means).

I/O block 12 is operative to perform I/O functions of telecommunications apparatus 100. According to an exemplary embodiment, I/O block 12 is operative to transmit signals to and receive signals from other devices, systems and/or apparatuses in one or more different networks. I/O block 12 may include one or more antenna elements, plugs, and/or other types of I/O elements.

Processor 14 is operative to perform various signal processing and control functions of telecommunications apparatus 100. According to an exemplary embodiment, processor 14 is operative to execute software code that enables a picture CID feature according to principles of the present disclosure. According to this exemplary embodiment, processor 14 enables display of a plurality of pictures via display 18 in response to receiving an incoming phone call from a phone number associated with the pictures. According to at least one exemplary embodiment, the pictures are displayed one at a time in a rotating manner (e.g., as a slideshow, etc.). With this exemplary embodiment, processor 14 also causes the rotation of the pictures to be interrupted in response to detecting a predetermined condition, such as when a user answers the phone call or upon completion of the phone call (i.e., when the user hangs up). Further details regarding the picture CID feature of the present disclosure will be provided later herein.

Processor 14 is also operative to perform and/or enable functions of telecommunications apparatus 100 including detecting and processing user inputs made via user input terminal 10, reading and writing data from and to memory 16, performing call processing functions including dialing out and call receiving functions, enabling display of pictures and user interfaces via display 18, and/or other functions.

Memory 16 is operative to perform data storage functions of telecommunications apparatus 100. According to an exemplary embodiment, memory 16 stores data including executable software code, images (e.g., still pictures and/or moving pictures/video), on-screen display data, phone numbers including numbers of previously dialed calls and previously received calls, user setup data including data indicating associations between pictures and phone numbers, and/or other data.

Display 18 is operative to provide visual displays under the control of processor 14. According to an exemplary embodiment, display 18 provides visual displays of a plurality of pictures (e.g., one at a time in a rotating manner, or as a video sequence of moving pictures) in response to receiving an incoming phone call from a phone number associated with the pictures. Display 18 may also be implemented as a touch-screen. In such a case, display 18 may include touch icons that correspond to one or more keys of user input terminal 10. Voice transceiver 20 is operative to transmit and receive voice data to and from processor 14 during phone calls.

Figure 2:
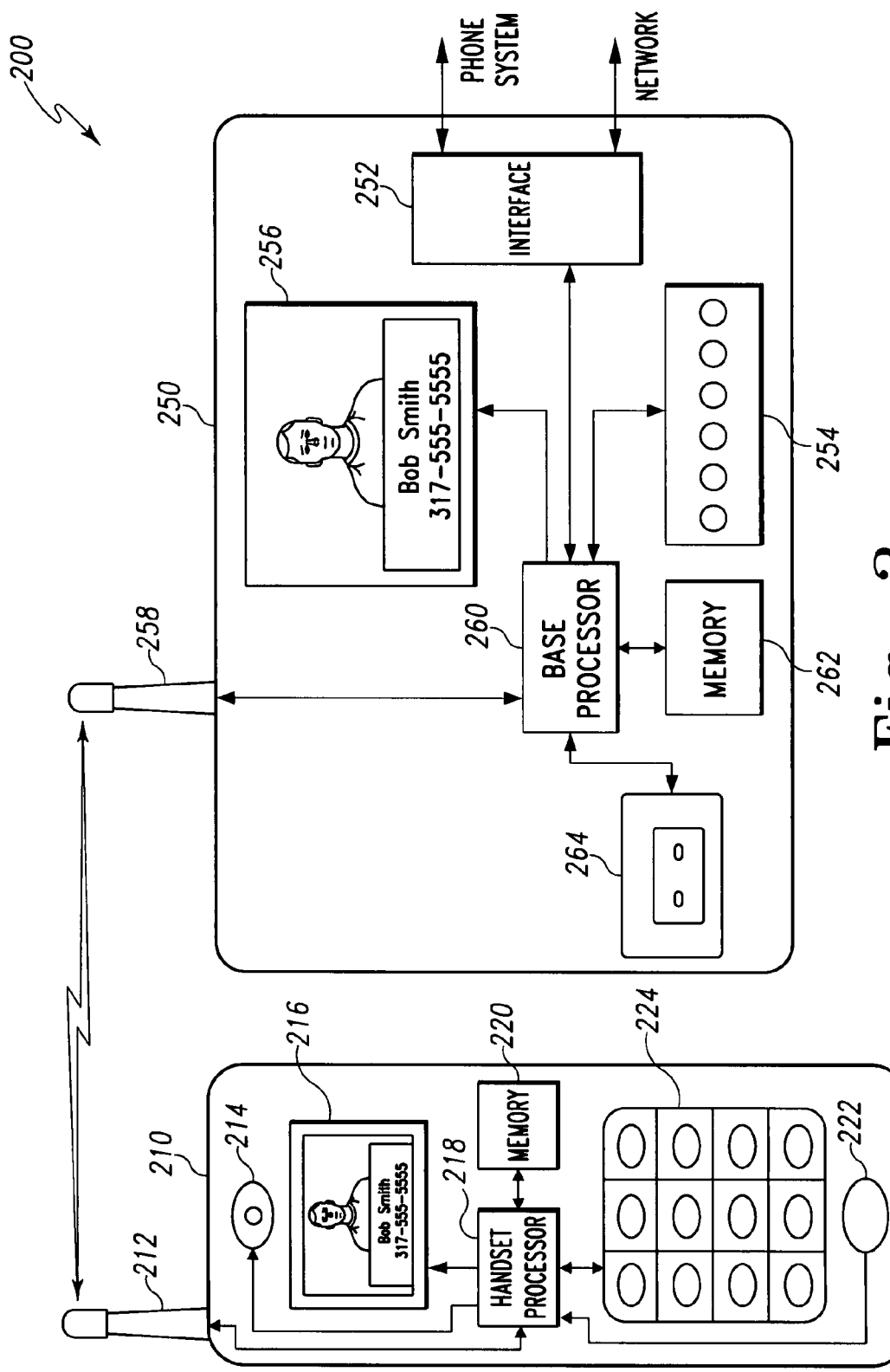
FIG. 2 is a block diagram of another exemplary embodiment of the present disclosure.

Referring now to FIG. 2, a block diagram of another embodiment of a telephone apparatus 200 according to aspects of the present disclosure is shown. Telephone apparatus 200 comprises two main blocks, a handset 210 and a base unit 250. Handset 210 includes an antenna circuit 212, earpiece 214, display 216, handset processor 218, memory 220, mouthpiece 222, and keypad 224. Base unit 250 includes interface circuit 252, user interface 254, display 256, antenna circuit 258, base processor 260, memory 264, and handset cradle 264. Some of the foregoing elements of telephone apparatus 200 may be implemented using one or more integrated circuits (ICs). For clarity of description, certain conventional elements associated with telephone apparatus 200 such as certain control signals, power signals and/or other elements may not be shown in FIG. 2.

Within handset 210, handset processor 218 connects to antenna circuit 212, earpiece 214, display 216, memory 220, mouthpiece 222, and keypad 224. Handset processor 218 provides features similar to those features described above for processor 14, including receiving and transmitting of information, such as voice, video or data, through antenna circuit 212 as well as decoding user inputs from keypad 224. Handset processor 218 also translates and decodes between telephony signals and voice signals received from mouthpiece 222 sent to earpiece 214 and for the user. Handset processor 218 also decodes picture information that may be delivered through antenna circuit 212 or stored and retrieved in memory 220 and displayed on display 216.

Within base unit 250, base processor 260 connects to interface 252, user interface 254, display 256, antenna circuit 258, memory 262, and handset cradle 264. Base processor 260 provides features similar to those features described above for processor 14, including receiving and transmitting of information, such as voice, video or data, through antenna circuit 259 as well as decoding user inputs from and providing user status to user interface 254.

It is important to note that only the base unit 250 or handset unit 210 may include a display element. For example, display 216 may not be present in handset 210. Only display 256 in base unit 250 may be present and capable of displaying pictures and other information. Additionally the display capabilities of display 216 in handset unit 210 and display 256 in base unit 250 may be different. For example, display 216 may be capable of displaying black and white text information such as a phone number. Display 256 may be capable of displaying color images and pictures as well as displaying other information related to the phone call.

It is also important to note that functions performed by base processor 260 and handset processor 218 as described here may compliment as well as overlap each other. For instance, base processor 260 may include a circuit such as a display controller that controls enabling display of pictures on one or both of display 216 and display 256. Handset processor 218 may include only a display control circuit that is responsive to the display controller in base processor 260.

Base processor 260 also decodes and controls signals received or sent through interface 252. Interface 252 provides an interface for signals to and form external devices and networks. In a preferred embodiment, interface 252 provides an interface to a standard telephone line call system for voice calling and also provides an interface to a computer or internet network for transfer of data. Base processor 260 also decodes picture information that may be delivered through antenna circuit 258, delivered through interface 252 or stored and retrieved in memory 262 and displayed on display 256.

Handset cradle 264 provides a stationary storage location for handset 210, for instance, when it is not in use. Handset cradle 264 may include connections that interface to connections on handset 210, not shown, for recharging of the battery power device in handset 210 or direct data communications between handset 210 and base unit 250. Base unit 250 may also include power supply circuits, not shown, for connecting to an electrical power outlet and powering the base unit as well as charging handset 210.

Wireless communications is established at the handset 210 through antenna circuit 212 and at the base unit 250 through antenna circuit 258. A communications protocol between handset 210 and base unit 250 in order to transfer voice information from the phone line connected to interface 252 to the user of handset 210. In a preferred embodiment, the communications protocol complies with the Digital Enhanced Cordless Telecommunications (DECT) 6.0 standard and permits separate transfer of voice information and data corresponding to video or control information. Both handset 210 and base unit 250 may also be capable of communicating on other wireless communications networks such as a wireless local area network (WLAN) or a cellular phone network.

Figure 3:
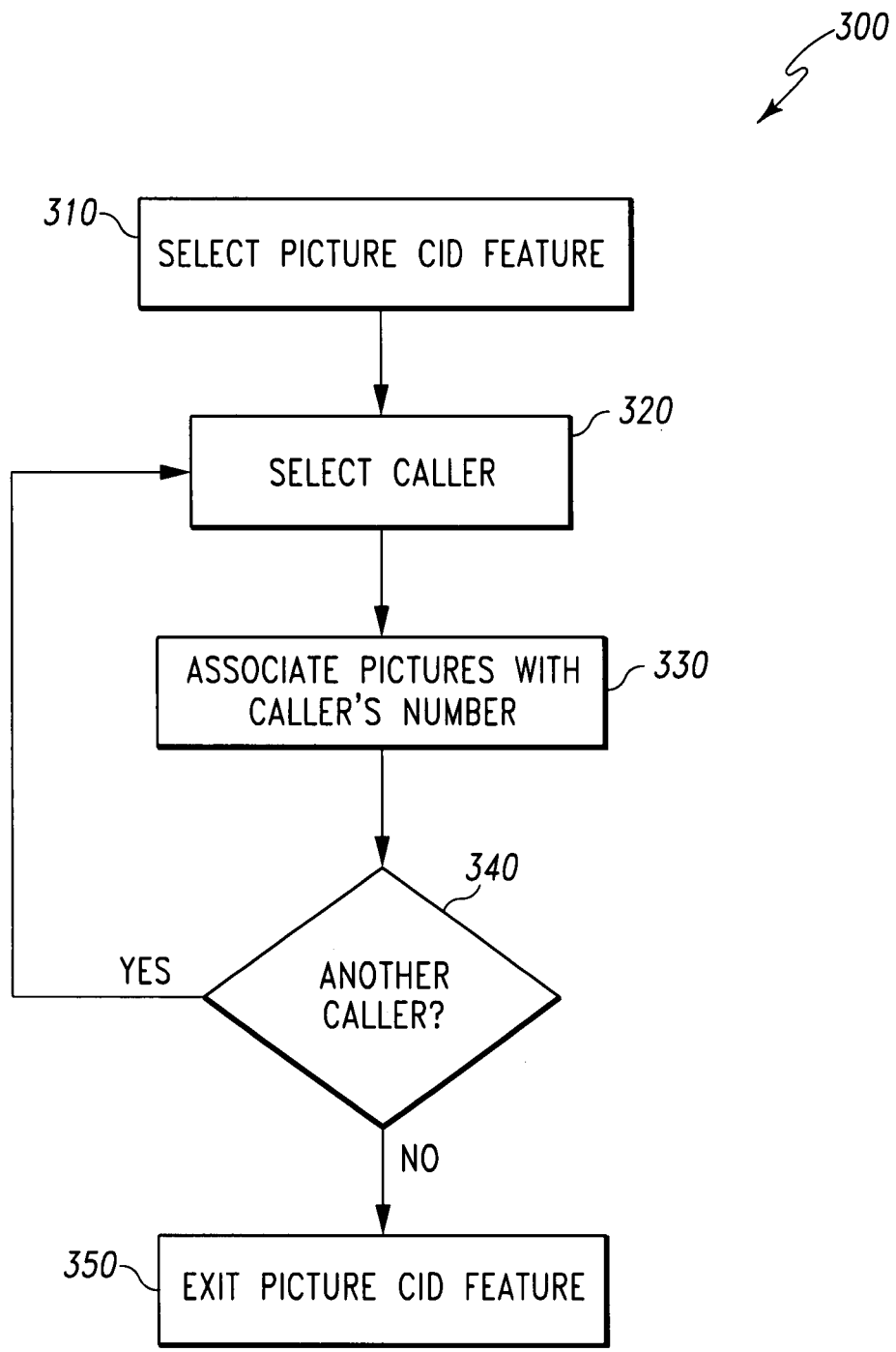
FIG. 3 is a flowchart illustrating steps for setting up a picture CID feature according to an exemplary embodiment the present disclosure.

Referring now to FIG. 3, a flowchart 300 illustrating steps for setting up a picture CID feature according to an exemplary embodiment of aspects of the present disclosure is shown. For purposes of example and explanation, the steps of FIG. 3 will be described primarily with reference to telecommunications apparatus 100 of FIG. 1. The steps of FIG. 3 may equally be described using embodiments such as telephone apparatus 200 in FIG. 2 The steps of FIG. 3 are exemplary only, and are not intended to limit the present disclosure in any manner.

At step 310, a user selects the picture CID feature. According to an exemplary embodiment, the user may select the picture CID feature at step 310 by providing one or more inputs via user input terminal 10 responsive to an on-screen menu provided via display 18 which lists a number of available features provided by telecommunications apparatus 100.

After the user selects the picture CID feature at step 310, process flow advances to step 320 where the user selects a caller. According to an exemplary embodiment, the user may select the caller at step 310 by providing one or more inputs via user input terminal 10 responsive to an on-screen menu provided via display 18 which lists a number of individual callers. The individual callers may be listed as stored CID records from previously received calls, or may be listed as entries in a phone book feature of telecommunications apparatus 100 which includes the names, phone numbers and/or other information associated with individual callers. Entries in the phone book may for example be manually entered by the user and stored in memory 16 during another set-up process for telecommunications apparatus 100 which will not be described herein.

After the user selects the caller at step 320, process flow advances to step 330 where the user causes a plurality of pictures to be associated with or linked to the caller's phone number. According to an exemplary embodiment, the user may select each of the pictures to be associated with the caller's phone number at step 330 under the control of processor 14 by providing one or more user inputs via user input terminal 10 in response to pictures displayed via display 18. The selected pictures may be stored in the local memory (i.e., memory 16) of telecommunications apparatus 100 and/or in a memory of another device that is operatively coupled to telecommunications apparatus 100 via I/O block 12. For instance, the selected pictures may be stored on a computer that is connected to the telecommunications apparatus 100 and/or stored in a repository located on the internet. The selected pictures may also be contained within one or more "containers" of pictures (e.g., folders, hard drives, etc.). Moreover, the selected plurality of pictures may represent still pictures and/or a video sequence of moving pictures. As referred to herein, the term "pictures" may refer to any type of pictures including photographs and/or graphical file images.

In addition to selecting pictures for storage, the user may also select pictures and communicate or transmit the selected pictures between a handset 210 and base unit 250 of a telephone apparatus 200 as shown in FIG. 2. For example, one picture may be selected and transmitted from the base unit 250 to the handset 210 for display on display 216 located on the handset 210. The selected picture may be used for display on the handset for receiving an incoming call, and may be different than pictures selected for display on display 256 located on base unit 250 of telephone apparatus 200. In another example, pictures may also be received through handset 210 and transmitted to base unit 250 for storage and future display.

During the picture associating process of step 330, the user may be given an opportunity to modify a parameter of one or more of the selected pictures. For instance, parameters for cropping, shading, and resizing, along with other known picture parameters may be modified. Also during the picture associating process of step 330, the user may be given an opportunity to select the manner in which the selected pictures are displayed when an incoming phone call from the corresponding phone number is received by telecommunications apparatus 100. For example, the user may designate that the selected pictures be displayed as a slide show. The slide show may be display the pictures one at a time in a rotating manner. The pictures may also be displayed all at once in a full screen mode, or as a mosaic of some or all of the selected pictures where "thumbnails" of the pictures can be of equal or unequal sizes, with any number of transition effects and/or different angular display orientations. In this manner, the user may select a temporal order that one or more of the selected pictures is displayed and/or may select a time period that one or more of the selected pictures is displayed. As another example, the user may designate that certain ones of the selected pictures are displayed first in a selected order, and that thereafter, the remaining selected pictures are displayed randomly. As yet another example, the user may designate that certain ones of the selected pictures are displayed for longer or shorter time periods than other selected pictures. An advantage of displaying certain pictures in different forms and in different time frames may improve both the visual appeal of the display as well as improve the functional benefit such as reducing the effect of image burn-in on the display.

Also during the picture associating process of step 330, the user may be given an opportunity to designate where the selected pictures are to be displayed when an incoming phone call from the corresponding phone number is received by telecommunications apparatus 100. For example, the user may designate that some or all of the selected pictures are displayed via display 18 of telecommunications apparatus 100 and/or via one or more other devices (e.g., base station 250, a computer monitor, a television screen, etc.). Data corresponding to all of the user's selections at step 230 are stored in memory 16.

After the user associates or links a plurality of pictures with the caller's phone number, and provides any other input selections at step 330, process flow advances to step 340 where the user is given an opportunity to select another caller. If the user so chooses to select another caller at step 340, process flow loops back to step 320 where another caller is selected. Thereafter, the selected caller is associated with a plurality of pictures at step 330, as previously described above. Alternatively, if the user chooses not to select another caller at step 340, process flow advances to step 350 where the user exits the picture CID feature by providing one or more inputs to telecommunications apparatus 100 via user input terminal 10.

It is noted that the steps of FIG. 3 may be varied in accordance with design choice. For example, the user may be given the opportunity to select pictures to be associated with a given caller (i.e., step 330 in FIG. 2 as shown) before actually selecting the caller (i.e., step 320 in FIG. 2 as shown).

Figure 4:
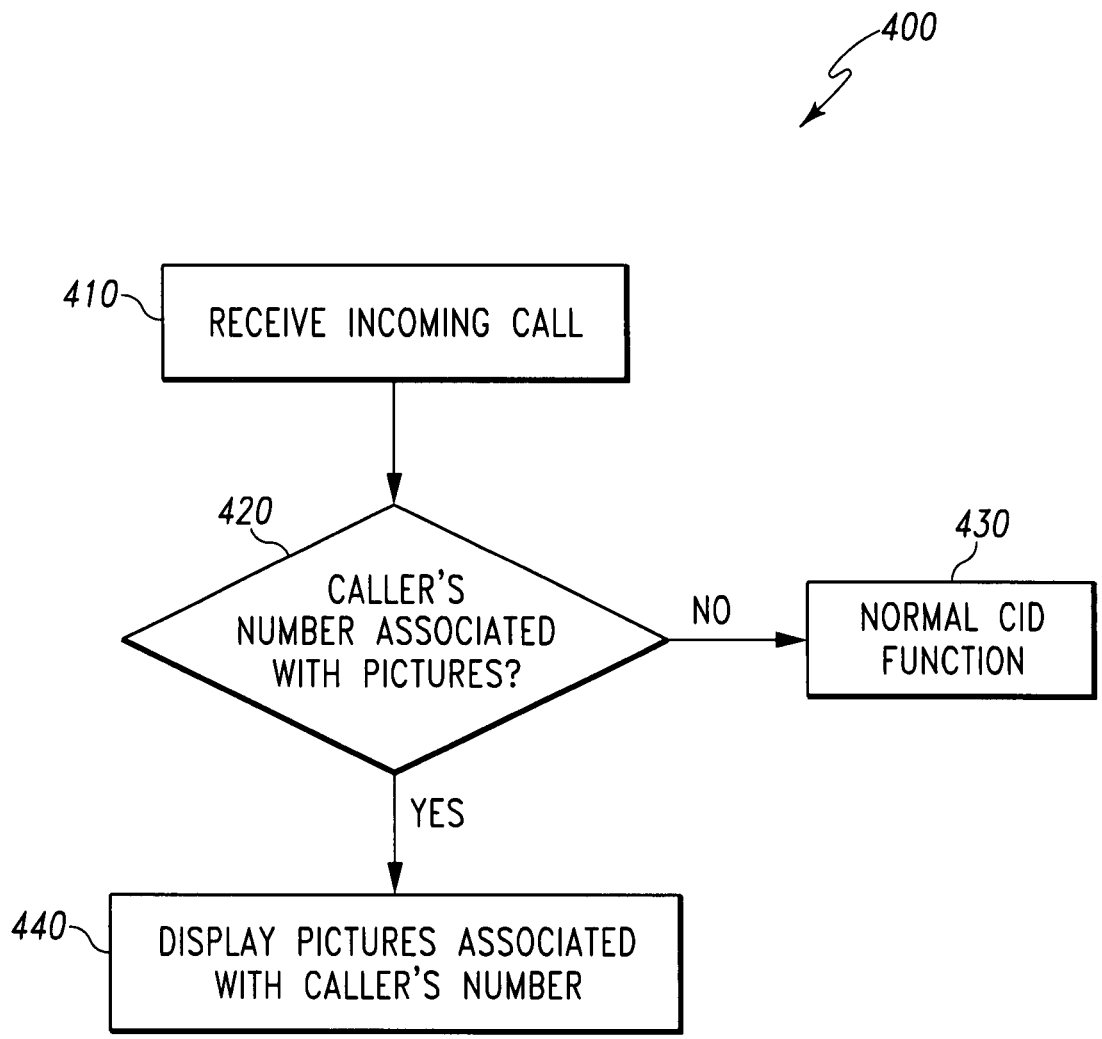
FIG. 4 is a flowchart illustrating steps for executing a picture CID feature according to an exemplary embodiment of the present disclosure.

Referring now to FIG. 4, a flowchart 400 illustrating steps for executing a picture CID feature according to an exemplary embodiment of aspects of the present disclosure is shown. For purposes of example and explanation, the steps of FIG. 4 will also be primarily described with reference to telecommunications apparatus 100 of FIG. 1. The steps of FIG. 4 may equally be described using embodiments such as telephone apparatus 200 in FIG. 2. The steps of FIG. 4 are exemplary only, and are not intended to limit the present disclosure in any manner.

At step 410, telecommunications apparatus 100 receives an incoming phone call. According to an exemplary embodiment, the incoming phone call includes CID information which indicates the caller's phone number and is detected by processor 14. Next, at step 420, a determination is made as to whether the caller's phone number is associated with pictures. According to an exemplary embodiment, processor 14 makes the determination at step 420 by comparing the received CID information with data stored in memory 16 from the set-up process for the picture CID feature described in FIG. 2.

If the determination at step 420 is negative, process flow advances to step 430 where telecommunications apparatus 100 provides a CID function in a normal manner under the control of processor 14. According to an exemplary embodiment, providing the CID function in a normal manner at step 430 includes displaying the caller's phone number, but does not include displaying a plurality of pictures associated with the caller.

Alternatively, if the determination at step 420 is positive, process flow advances to step 440 where telecommunications apparatus 100 displays the pictures associated with the caller's phone number under the control of processor 14 in accordance with the user selections made during step 430 of the set-up process for the picture CID feature described in FIG. 2. The pictures displayed at step 440 may be stored in and retrieved from the local memory (i.e., memory 16) of telecommunications apparatus 100 and/or in a memory of another device that is operatively coupled to telecommunications apparatus 100 via I/O block 12. By allowing pictures to be stored other than in telecommunications apparatus 100, lower cost is achieved through the benefit of sharing the storage in other devices. The pictures displayed at step 440 may represent still pictures and/or a video sequence of moving pictures.

As previously indicated herein, the user may select (i.e., at step 330 of FIG. 3) the manner in which the selected pictures are displayed at step 440 when an incoming phone call from the corresponding phone number is received by telecommunications apparatus 100. For example, the selected pictures may be displayed at step 440 as a slide show. For example, the user may designate that the selected pictures be displayed as a slide show. The slide show may be display the pictures one at a time in a rotating manner. The pictures may also be displayed all at once in a full screen mode, or as a mosaic of some or all of the selected pictures where "thumbnails" of the pictures can be of equal or unequal sizes, with any number of transition effects and/or different angular display orientations. In this manner, the temporal order that one or more of the selected pictures is displayed at step 440 and/or the time period that one or more of the selected pictures is displayed at step 440 may be controlled based on the prior user selections at step 330 of FIG. 3. According to at least one exemplary embodiment, when the pictures are displayed one at a time in a rotating manner as a slide show at step 440, processor 14 may cause the rotation of the pictures to be interrupted in response to detecting a predetermined condition, such as when a user answers the phone call or upon completion of the phone call, such as when the user hangs up. An advantage of allowing the interruption is to allow the user, for instance, to quickly change the display to another set of pictures, upon receiving a new phone call, or to alert the user of new information, such as the CID, regarding an incoming call.

Also previously indicated herein, the user may designate (i.e., at step 330 of FIG. 3) where the selected pictures are to be displayed at step 440 when an incoming phone call from the corresponding phone number is received by telecommunications apparatus 100. For example, the selected pictures may be displayed at step 440 via display 18 of telecommunications apparatus 100 and/or via one or more other devices (e.g., base station 250, a computer monitor, a television screen, etc.). In addition to the plurality of pictures, the caller's phone number and name may also be displayed via display 18 at step 440.

As described herein, the present embodiments provide a method and apparatus for providing a picture CID feature that provides enhanced to entertainment value and is also capable of preventing screen burn. While the embodiments have been described as having a preferred design, the present embodiments can be further modified within the spirit and scope of this disclosure. This application is therefore intended to cover any variations, uses, or adaptations of the invention using its general principles. Further, this application is intended to cover such departures from the present disclosure as come within known or customary practice in the art to which the present disclosure pertains and which fall within the limits of the appended claims.

What is claimed is:

1. A method of displaying photographs using a telecommunications apparatus, comprising the steps of:
    associating a first plurality of photographs with a first phone number, said associating step enabling a user to modify a parameter of at least one of said first plurality of photographs; and
    displaying said first plurality of photographs one at a time in a rotating manner in response to receiving a phone call from said first phone number,
    wherein said associating step further includes enabling a user to select a time period that at least one of said first plurality of photographs is displayed.

2. The method of claim 1, further comprising the steps of:
    associating a second plurality of photographs with a second phone number; and
    displaying said second plurality of photographs one at a time in a rotating manner in response to receiving a phone call from said second phone number.

3. The method of claim 1, further comprising interrupting said rotation of said first plurality of photographs in response to one of a user answering said phone call and said user completing said phone call.

4. The method of claim 1, wherein said associating step includes enabling a user to select at least one of said first plurality of photographs.

5. The method of claim 1, wherein said associating step includes enabling a user to select a temporal order that at least one of said first plurality of photographs is displayed.

6. An apparatus, comprising:
    means for storing data indicating an association between a first plurality of photographs and a first phone number;
    means for selecting a time period that at least one of said first plurality of photographs is displayed;
    means for modifying a parameter of at least one of said first plurality of photographs; and
    means for enabling display of said first plurality of photographs one at a time in a rotating manner in response to receiving a phone call from said first phone number.

7. The apparatus of claim 6, wherein:
    said storing means stores data indicating an association between a second plurality of photographs and a second phone number; and
    said enabling means enables display of said second plurality of photographs one at a time in a rotating manner in response to receiving a phone call from said second phone number.

8. The apparatus of claim 6, wherein enabling means causes said rotation of said first plurality of photographs to be interrupted in response to one of a user answering said phone call and said user completing said phone call.

9. The apparatus of claim 6, wherein the apparatus further comprises a means for selecting at least one of said first plurality of photographs.

10. The apparatus of claim 6, wherein the apparatus further comprises a means for selecting a temporal order that at least one of said first plurality of photographs is displayed.

11. The apparatus of claim 6, wherein said first plurality of photographs represents a video sequence of moving photographs.

12. The apparatus of claim 6, wherein said first plurality of photographs is stored in said storing means.

13. An apparatus, comprising:
- a memory for storing data indicating an association between a plurality of photographs and a phone number;
- a controller coupled to said memory for enabling: display of said plurality of photographs in response to receiving a phone call from said number, a user to modify a parameter of at least one of said first plurality of photographs, and a user to select a time period that at least one of said first plurality of photographs is displayed; and
- a display coupled to said controller for displaying said plurality of photographs one at a time in a rotating manner as determined by controller.

14. The apparatus of claim 13, wherein said display is in a base unit of said phone apparatus.

15. The apparatus of claim 13, wherein the association between a plurality of photographs and a phone number includes a first association between a first plurality of photographs and a first phone number and a second association between a second plurality of photographs and a second phone number.

16. The apparatus of claim 13, wherein said controller causes said rotation of said plurality of photographs to be interrupted in response to one of a user answering said phone call and said user completing said phone call.

17. The apparatus of claim 13, wherein a user selects at least one of said plurality of photographs.

18. The apparatus of claim 17, wherein the at least one of said plurality of photographs is communicated between a base unit and a handset.

* * * * *